US012674403B2

(12) United States Patent
Blackburn, Jr. et al.

(10) Patent No.: US 12,674,403 B2
(45) Date of Patent: *Jul. 7, 2026

(54) FLUID EVACUATION COLLECTION VESSEL ASSEMBLIES AND FLUID EVACUATION SYSTEMS AND METHODS

(71) Applicant: JohnDow Industries, Inc., Barberton, OH (US)

(72) Inventors: John H. Blackburn, Jr., Ann Arbor, MI (US); John H. Blackburn, Greenville, SC (US)

(73) Assignee: JohnDow Industries, Inc., Barberton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/347,967

(22) Filed: Oct. 2, 2025

(65) Prior Publication Data

US 2026/0028926 A1      Jan. 29, 2026

Related U.S. Application Data

(62) Division of application No. 19/086,471, filed on Mar. 21, 2025, now Pat. No. 12,454,900.

(Continued)

(51) Int. Cl.
F01M 11/04          (2006.01)
F16N 31/00          (2006.01)

(52) U.S. Cl.
CPC ....... F01M 11/045 (2013.01); F01M 11/0408 (2013.01); F16N 31/00 (2013.01)

(58) Field of Classification Search
CPC .. F01M 11/045; F01M 11/04; F01M 11/0408; B65D 81/2007; B65D 81/2015; B65D 81/2038
See application file for complete search history.

(56) References Cited

U.S. PATENT DOCUMENTS 777,704 A * 12/1904 Tucker ................... F16N 21/06
                                                     184/92
1,609,697 A * 12/1926 Collier ................ F01M 11/045
                                                     210/171

(Continued)

FOREIGN PATENT DOCUMENTS

BR        202017013259 U2 * 1/2019   ............ F01M 11/04
DE               9305214 U1 * 4/1993

(Continued)

*Primary Examiner* — David Colon-Morales
(74) *Attorney, Agent, or Firm* — Renner, Kenner, Greive, Bobak, Taylor & Weber

(57)          ABSTRACT

A collection vessel for receiving a fluid from a fluid evacuation system includes an internal volume for fluid, a support member within the internal volume, and one or more reinforcement members mounted to the support member and maintaining the internal volume of the collection vessel. Fluid evacuation systems for evacuating fluid from a reservoir include a vacuum source and one or more fluid extraction apparatuses, each including an extraction device and a collection vessel for receiving the fluid including an extraction valve in fluid communication with the internal volume and with the extraction device, a vacuum source valve wherein the vacuum source valve is in fluid communication with the internal volume and the vacuum source, and a drain valve in fluid communication with the internal volume and a storage tank. During a fluid evacuation process the internal volume is subjected to vacuum pressure generated by the vacuum source.

20 Claims, 10 Drawing Sheets

Related U.S. Application Data

(60) Provisional application No. 63/570,211, filed on Mar. 26, 2024.

(56) References Cited

U.S. PATENT DOCUMENTS

| | | | | | |
|---|---|---|---|---|---|
| 1,815,221 | A | * | 7/1931 | Sweetland | F01M 11/045 184/1.5 |
| 1,818,122 | A | * | 8/1931 | Engbrecht | F01M 11/0408 184/1.5 |
| 1,841,505 | A | * | 1/1932 | Sweetland | F01M 11/045 417/189 |
| 2,124,798 | A | * | 7/1938 | Schuler | F01M 11/04 134/107 |
| 2,552,749 | A | * | 5/1951 | Tabet | F01M 11/045 222/25 |
| 2,612,289 | A | * | 9/1952 | Koester | F01M 11/045 222/394 |
| 2,682,886 | A | * | 7/1954 | Paxton | F01M 11/045 248/152 |
| 2,740,420 | A | * | 4/1956 | Hanks | F01M 11/045 137/205 |
| 3,033,311 | A | * | 5/1962 | Edgar | G01F 23/04 33/726 |
| 3,132,762 | A | * | 5/1964 | Gabarro | F17C 3/08 220/560.05 |
| 3,430,730 | A | * | 3/1969 | Kitajima | F01M 11/045 184/1.5 |
| 4,095,672 | A | * | 6/1978 | Senese | F02B 77/04 417/183 |
| 4,095,673 | A | * | 6/1978 | Takeuchi | B67D 7/845 184/106 |
| 4,378,026 | A | * | 3/1983 | Bauer | F01M 11/045 137/355.16 |
| 4,524,811 | A | * | 6/1985 | Taylor | F01M 11/10 220/361 |
| 4,603,666 | A | * | 8/1986 | Martinelli | G05D 9/02 123/196 S |
| 5,001,805 | A | * | 3/1991 | Stouky | F01M 11/045 15/302 |
| 5,238,085 | A | * | 8/1993 | Engelmann | F01M 11/12 123/196 S |
| 5,405,247 | A | * | 4/1995 | Goodman | F01M 11/045 417/139 |
| 5,492,144 | A | * | 2/1996 | Kriewaldt | F01M 11/045 137/208 |
| 5,746,259 | A | * | 5/1998 | Noble, III | F01P 11/0204 165/95 |
| 6,022,473 | A | * | 2/2000 | Mickelson | B67D 7/845 210/94 |
| 6,036,446 | A | * | 3/2000 | Goodman | F01M 11/045 417/54 |
| 6,082,416 | A | * | 7/2000 | Viken | F16H 57/0408 141/98 |
| 6,092,390 | A | * | 7/2000 | Griffith, Jr. | F01M 11/045 62/84 |
| 6,267,160 | B1 | * | 7/2001 | Viken | F01M 11/0458 141/98 |
| 6,321,874 | B1 | * | 11/2001 | Miyamoto | F01M 11/045 137/205 |
| 6,390,149 | B1 | * | 5/2002 | Arbey | F01M 11/045 141/98 |
| 6,568,507 | B2 | * | 5/2003 | Chandler | F01M 11/045 123/196 R |
| 6,830,082 | B2 | * | 12/2004 | Few | B60S 5/00 141/2 |
| 6,886,606 | B2 | * | 5/2005 | Few | F01M 11/04 137/884 |
| 9,260,988 | B2 | * | 2/2016 | Lin | F01M 11/0458 |
| 10,363,907 | B2 | * | 7/2019 | Erwin | B67D 7/78 |
| 10,557,410 | B2 | * | 2/2020 | Horriat | F01M 11/04 |
| 10,646,988 | B2 | * | 5/2020 | Liao | B25H 3/006 |
| 11,073,221 | B2 | * | 7/2021 | Fontaine | F16K 31/423 |
| 11,255,237 | B2 | * | 2/2022 | Lentini | F04B 53/16 |
| 11,346,261 | B2 | * | 5/2022 | Bedi | F01M 11/0004 |
| 11,867,100 | B2 | * | 1/2024 | Fisher | F01M 11/045 |
| 12,454,900 | B2 | * | 10/2025 | Blackburn, Jr. | F01M 11/0458 |
| 2007/0029139 | A1 | * | 2/2007 | Erwin | F01M 11/04 184/1.5 |

FOREIGN PATENT DOCUMENTS

| | | | | | |
|---|---|---|---|---|---|
| DE | 4436025 | A1 * | 4/1996 | | F01M 11/045 |
| DE | 29814114 | U1 * | 12/1999 | | F01M 11/045 |
| DE | 202022100078 | U1 * | 2/2022 | | F01M 11/045 |
| FR | 2449810 | A1 * | 2/1979 | | |
| FR | 2560588 | A1 * | 9/1985 | | F01M 11/045 |
| FR | 2589807 | A1 * | 5/1987 | | F01M 11/045 |
| FR | 2780715 | A1 * | 1/2000 | | F01M 11/045 |
| FR | 2936274 | A1 * | 3/2010 | | F01M 11/10 |
| GB | 1094021 | A * | 12/1967 | | F01M 11/045 |
| KR | 20110005515 | U * | 6/2011 | | F01M 13/04 |
| KR | 101503769 | B1 * | 3/2015 | | B60S 5/00 |
| WO | WO-2017086603 | A1 * | 6/2017 | | F04B 53/04 |

* cited by examiner

FLUID EVACUATION COLLECTION VESSEL ASSEMBLIES AND FLUID EVACUATION SYSTEMS AND METHODS

CROSS-REFERENCE TO RELATED APPLICATIONS

This application is a divisional application of U.S. patent application Ser. No. 19/086,471, filed on Mar. 21, 2025, pending, which claims the benefit of U.S. Provisional Application Ser. No. 63/570,211 filed on Mar. 26, 2024, all of which are incorporated herein by reference in their entirety.

FIELD OF THE INVENTION

The present invention relates generally to fluid evacuation systems, and more particularly to fluid evacuation collection vessel assemblies within fluid evacuation systems for collecting fluids evacuated from an engine or machine using vacuum pressures induced within the fluid evacuation systems.

BACKGROUND OF THE INVENTION

Maintaining engines, including those found in automobiles, and other pieces of machinery requires routine fluid exchange processes to maintain performance, achieve longevity, and improve reliability. In many cases lubricating fluids, including motor oil, are removed, and replaced with fresh motor oil on a regular schedule determined by engine runtime, mileage, or date since last oil change. Oil changes may be performed through manual procedures at service centers or by vehicle owners themselves. Generally, an oil change requires inspecting the vehicle, including the oil fill cap, location of the oil filter, and access to the oil drain plug. The vehicle is then positioned such that the old oil may be drained through the oil drain plug. The oil filter is replaced, along with the drain plug. Finally, the new oil is added to the engine according to the engine's oil capacity and rate at which the engine can be filled.

Oil change procedures include obtaining access to the bottom of the engine using lifts, jacks, or pits to allow the used motor oil to be drained via gravity before being filled with fresh oil. Some service centers adopted methods and procedures referred to as quick oil changes. Such service centers typically have several drive-through bays where a customer drives their car into the bay, over a pit, where an oil change may be performed with the customer needing to exit their vehicle. During the oil change a service technician in the bay coordinates with a service technician in the pit to facilitate the oil change, which despite the use of the word "quick," may still take upwards of 30 minutes or more to complete the service. A large portion of this time is allocated to the oil draining process.

In effort to improve the average speed of an oil change service, these high throughput service centers, including quick change and fleet maintenance centers, have adopted other processes to increase speed of the step of removing oil from the engine using fluid extraction machines. Fluid extraction machines generally include a pump to create a vacuum for removing the fluid from a reservoir, a hose and extraction assembly to be placed in the reservoir containing the fluid to be removed, and a fluid reservoir, or collection vessel, for containing the extracted fluid. Such machines may further include filtration systems, control systems, and may be in the form of a cart that may be maneuvered within the service station. These systems are not without their drawbacks. For example, venturi vacuum generators mounted to a collection vessel or tank rely on a ball valve to control the air supplied to the venturi and a manually operated plunger on the collection vessel to vent and empty the collected fluid. Other systems include a simple ball valve on the bottom of the collection vessel and a manual ball valve vent at the top. Such systems offer inconsistent quality of vacuum with fluctuating differential pressures. In the case of positive displacement pumps greatly diminished performance due to degradation and wear caused by extracted fluids is observed. Further, for venturi systems the use of air compressors requires additional maintenance and energy costs.

In light of the foregoing, there exists a need for further advancements in the field of fluid evacuation systems, particularly in regard to vacuum based systems in order to promote efficiency, convenience during use, ease of maintenance and improved environmental responsibility.

SUMMARY OF THE INVENTION

An embodiment of the present invention provides a collection vessel assembly for receiving a fluid including a collection vessel, a vacuum source valve in fluid communication with the collection vessel, a drain valve in fluid communication with the collection vessel, and an interconnection between the vacuum source valve and the drain valve configured to operate the vacuum source valve and the drain valve in a plurality of interconnected states.

Another embodiment of the present invention provides a collection vessel assembly as in any embodiment above, wherein manipulation of the interconnection to a fluid extraction state exposes the collection vessel to vacuum pressure while placing the vacuum source valve in an open position and the drain valve in a closed position.

Another embodiment of the present invention provides a collection vessel assembly as in any embodiment above, wherein manipulation of the interconnection to a drain state exposes the collection vessel to atmosphere while placing the drain valve in an open position to permit drainage of any fluid in the collection vessel through the drain valve.

Another embodiment of the present invention provides a collection vessel assembly as in any embodiment above, wherein, in the drain state, the collection vessel is exposed to atmosphere through the vacuum source valve being in an open to atmosphere and closed to vacuum position.

Another embodiment of the present invention provides a collection vessel assembly as in any embodiment above, wherein the interconnection is a mechanical interconnect comprising a vacuum source valve extension attached to the vacuum source valve, a drain valve extension attached to the drain valve, a vertical extension attached to vacuum source valve extension and the drain valve extension, a handle portion, and wherein the handle portion is configured to operate the interconnect in each of the plurality of interconnected states.

Another embodiment of the present invention provides a collection vessel assembly as in any embodiment above, wherein the vacuum source valve and the drain valve are pneumatically actuated valves, and wherein the interconnection is a pneumatic interconnection comprising a pneumatic control system for actuating the vacuum source valve and the drain valve.

Another embodiment of the present invention provides a collection vessel assembly as in any embodiment above, wherein the vacuum source valve and the drain valve are electronically actuated valves, and wherein the interconnection is an electronic interconnection comprising an electronic control system for actuating the vacuum source valve and the drain valve.

Another embodiment of the present invention provides a collection vessel assembly as in any embodiment above, where when the interconnection is manipulated from the fluid extraction state to the drain state the vacuum source valve is closed to vacuum and the collection vessel is exposed to atmosphere prior to the drain valve opening to the open position.

Another embodiment of the present invention provides a collection vessel assembly as in any embodiment above, further comprising a backflow prevention valve.

Another embodiment of the present invention provides a collection vessel assembly as in any embodiment above, further comprising an internal volume for containing the fluid, a support member, and one or more reinforcement members mounted to the support member, wherein the one or more reinforcement members maintain the internal volume of the collection vessel.

An embodiment of the present invention provides a collection vessel assembly for receiving a fluid including an internal volume for containing the fluid, a support member, and one or more reinforcement members mounted to the support member, wherein the one or more reinforcement members maintain the internal volume of the collection vessel.

Another embodiment of the present invention provides a collection vessel assembly as in any embodiment above, wherein the collection vessel is substantially cylindrical with a top end, a bottom end, and a wall extending between the top end and the bottom end to define the internal volume, wherein the support member is secured to the top end and the bottom end.

Another embodiment of the present invention provides a collection vessel assembly as in any embodiment above, wherein the reinforcement member is a disk mounted to the support member, wherein the disk extends outwardly from the support member and is proximate to an inner surface of the wall, wherein the disk reinforces the wall to thereby prevent the wall from deforming when the internal volume of the collection vessel is under vacuum.

Another embodiment of the present invention provides a collection vessel assembly as in any embodiment above, wherein the reinforcement member includes one or more apertures.

Another embodiment of the present invention provides a collection vessel assembly as in any embodiment above, wherein the support member has a drain adjacent to the bottom end of the collection vessel.

Another embodiment of the present invention provides a collection vessel assembly as in any embodiment above, further comprising a backflow prevention valve.

An embodiment of the present invention provides a system for evacuating fluid from a reservoir, the system including a vacuum source, and a fluid extraction apparatus, the fluid extraction apparatus including an extraction device, and a collection vessel assembly as in any embodiment above, further including an extraction inlet in fluid communication with the extraction device, wherein the vacuum source valve is in fluid communication with the vacuum source, wherein the drain valve is in fluid communication with an outlet.

Another embodiment of the present invention provides a system for evacuating fluid from a reservoir as in any embodiment above, wherein the interconnect is operated between the plurality of interconnected states depending upon the progress of a fluid evacuation process.

Another embodiment of the present invention provides a system for evacuating fluid from a reservoir as in any embodiment above, wherein during the fluid evacuation process the extraction device is placed in fluid communication with a fluid within a fluid reservoir, the interconnect is operated in the fluid extraction state, and the vacuum source maintains a vacuum to thereby extract the fluid through the extraction device and into the collection vessel.

Another embodiment of the present invention provides a system for evacuating fluid from a reservoir as in any embodiment above, wherein the fluid collected in the collection vessel is drained from the collection vessel by operating the interconnect in the drain state to thereby expose the collection vessel to atmosphere while placing the drain valve in an open position to permit drainage of any fluid in the collection vessel through the drain valve.

Another embodiment of the present invention provides a system for evacuating fluid from a reservoir as in any embodiment above, further comprising a plurality of fluid extraction apparatuses, each fluid extraction apparatus of the plurality of fluid extraction apparatuses being in fluid communication with the vacuum source.

Another embodiment of the present invention provides a system for evacuating fluid from a reservoir as in any embodiment above, wherein each fluid extraction apparatus of the plurality of fluid extraction apparatuses is independently operable for each performing a fluid evacuation process.

DETAILED DESCRIPTION OF ILLUSTRATIVE EMBODIMENTS

Introduction

Embodiments of the present invention are based, at least in part, on the discovery of improved fluid evacuation collection vessel assemblies and fluid evacuation systems. In particular, embodiments of the present invention provide fluid evacuation systems based upon the use of a vacuum source to create a vacuum in a fluid evacuation collection vessel assembly to readily evacuate fluid from a reservoir via an extraction wand in fluid communication with the fluid evacuation collection vessel assembly. Advantageously, more than one fluid evacuation collection vessel assembly may be connected to the same vacuum source. Further, embodiments of the present invention advantageously provide simplified operation and improved efficiency for rapidly cycling between extraction and draining operations, while also operating at a higher vacuum with less fluctuation during an extraction process using the fluid evacuation system.

Fluid Evacuation System

Figure 1:
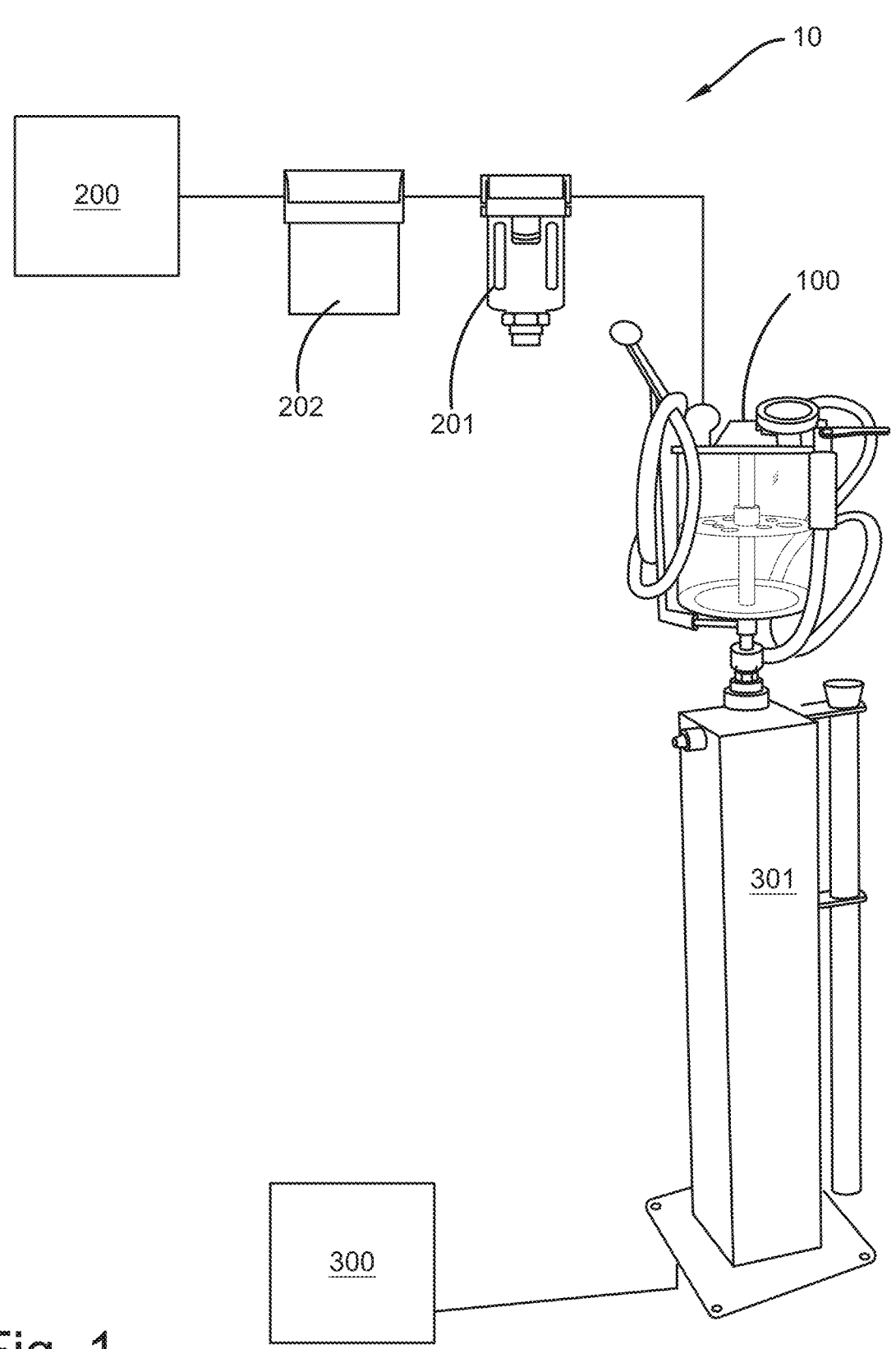
FIG. 1 is a schematic view of an embodiment of a fluid evacuation system according to an embodiment of the present invention.

Embodiments of the present invention provide systems for evacuating fluid from a reservoir. As shown in FIG. 1, an exemplary fluid evacuation system 10, which may also be referred to as a fluid extraction system 10, includes a fluid extraction apparatus 100 in fluid communication with a vacuum system 200 and fluid reservoir 300. Vacuum system 200 may include protective devices in fluid communication with vacuum system 200 and fluid evacuation collection vessel assembly 100 including water filter 201 and oil filter 202, which function to protect vacuum system 200 from being contaminated or fouled with extracted fluids which may include oil and water, including vapors. Fluid extraction apparatus 100 may be mounted on pedestal 301, which is in fluid communication with fluid reservoir 300.

Vacuum system 200 may be selected from a variety of suitable vacuum systems capable of providing a vacuum for fluid extraction processes. Suitable vacuum systems typically include a vacuum pump which is used to create vacuum pressure within fluid evacuation system 10. In some embodiments, vacuum pumps suitable for use within vacuum system 200 may be characterized by the type of vacuum pump. In some embodiments, vacuum pumps suitable for use within vacuum system 200 include one or more of primary pumps, booster pumps, and secondary pumps, which may also be referred to as high vacuum pumps.

In some embodiments, vacuum pumps suitable for use within vacuum system 200 may be characterized by pressure ranges generated by the vacuum pump. In some embodiments, vacuum pumps suitable for use within vacuum system 200 produce a low vacuum characterized as producing a vacuum pressure range of from about 100 Pa to about 100,000 Pa. In other embodiments, vacuum pumps suitable for use within vacuum system 200 produce a medium vacuum characterized as producing a vacuum pressure range of from about 0.100 Pa to about 100 Pa. In some embodiments, vacuum system 200 is configured to provide a plurality of vacuum states including a plurality of vacuum pressures. In these and other embodiments, vacuum pumps suitable for use within vacuum system 200 produce a vacuum pressure range of from 0.100 Pa to about 100,000 Pa.

In some embodiments, vacuum system 200 may be characterized by a percentage vacuum (% Vacuum) generated by the vacuum pumps. In some embodiments, vacuum system 200 provides a vacuum of 30% Vacuum or greater. In these and other embodiments, vacuum system 200 provides a vacuum of 60% Vacuum or greater. In these and other embodiments, vacuum system 200 provides a vacuum of 70% Vacuum or greater. In these and other embodiments, vacuum system 200 provides a vacuum of 80% Vacuum or greater. In these and other embodiments, vacuum system 200 provides a vacuum of 90% Vacuum or greater. In these and other embodiments, vacuum system 200 provides a vacuum of 91% Vacuum or greater. In these and other embodiments, vacuum system 200 provides a vacuum of 92% Vacuum or greater. In these and other embodiments, vacuum system 200 provides a vacuum of 93% Vacuum or greater. In these and other embodiments, vacuum system 200 provides a vacuum of 94% Vacuum or greater. In these and other embodiments, vacuum system 200 provides a vacuum of 95% Vacuum or greater.

In some embodiments, vacuum system 200 may be characterized by a relative vacuum (inHg (rel)) generated by the vacuum pumps. In some embodiments, vacuum system 200 provides a vacuum of 20.00 inHg (rel) or greater. In these and other embodiments, vacuum system 200 provides a vacuum of 21.00 inHg (rel) or greater. In these and other embodiments, vacuum system 200 provides a vacuum of 22.00 inHg (rel) or greater. In these and other embodiments, vacuum system 200 provides a vacuum of 23.00 inHg (rel) or greater. In these and other embodiments, vacuum system 200 provides a vacuum of 24.00 inHg (rel) or greater. In these and other embodiments, vacuum system 200 provides a vacuum of 25.00 inHg (rel) or greater. In these and other embodiments, vacuum system 200 provides a vacuum of 26.00 inHg (rel) or greater.

In one or more embodiments, vacuum system 200 is able to provide an operable working vacuum between 5 and 30 seconds after start-up. In these and other embodiments, vacuum system 200 is able to provide an operable working vacuum between 5 and 25 seconds after start-up. vacuum system 200 is able to provide an operable working vacuum between 5 and 20 seconds after start-up. vacuum system 200 is able to provide an operable working vacuum between 5 and 15 seconds after start-up.

In one or more embodiments, vacuum system 200 maintains the operable working vacuum with near instantaneous recovery of vacuum pressure during operation of the fluid evacuation system. In these and other embodiments, vacuum system 200 maintains the operable working vacuum with near instantaneous recovery of vacuum pressure during operation of the fluid evacuation system including two or more fluid extraction apparatuses in fluid communication with vacuum system 200 being used for fluid extraction processes.

In one or more embodiments, vacuum systems suitable for use with embodiments of the present invention may have built in redundant systems to maintain vacuum in the case of a pump failure. Vacuum pumps used within vacuum system may further include a variety of protective measures to prevent damage to the vacuum pump. Vacuum system 200 may further include reservoir tanks to further increase the volume of the vacuum to improve operation via maintenance of a consistent vacuum. In some embodiments, a controller may be used to operate vacuum system 200 in one or more vacuum states. The vacuum system is advantageously sized to prevent inhibition of the creation of the vacuum.

Vacuum system 200 is in fluid communication with fluid extraction apparatus 100 and water filter 201 and oil filter 202, when present, via vacuum lines. In some embodiments water filter 201 and oil filter 202 may be a combined filtration unit. In these and other embodiments, the combined filtration unit coalesces water vapor and oil to prevent infiltration into the vacuum pumps. Other filtration systems may be used to protect the vacuum system.

Vacuum lines suitable for use in the present invention include flexible and rigid vacuum lines. Flexible vacuum lines may be constructed of rubber which may be reinforced with non-rubber materials such as a metal coil, and other flexible materials known in the art. Rigid vacuum lines may be constructed of plastic, metal, and other tubing known in the art.

In some embodiments, connections between vacuum lines and components of fluid evacuation system 10 may be characterized as being sealed such that no vacuum leaks occur. In these and other embodiments, connections may be coated with a sealant to thereby form an air-tight connection. In yet other embodiments, connections may incorporate O-rings and other sealing means for forming an air-tight connection.

Figure 2:
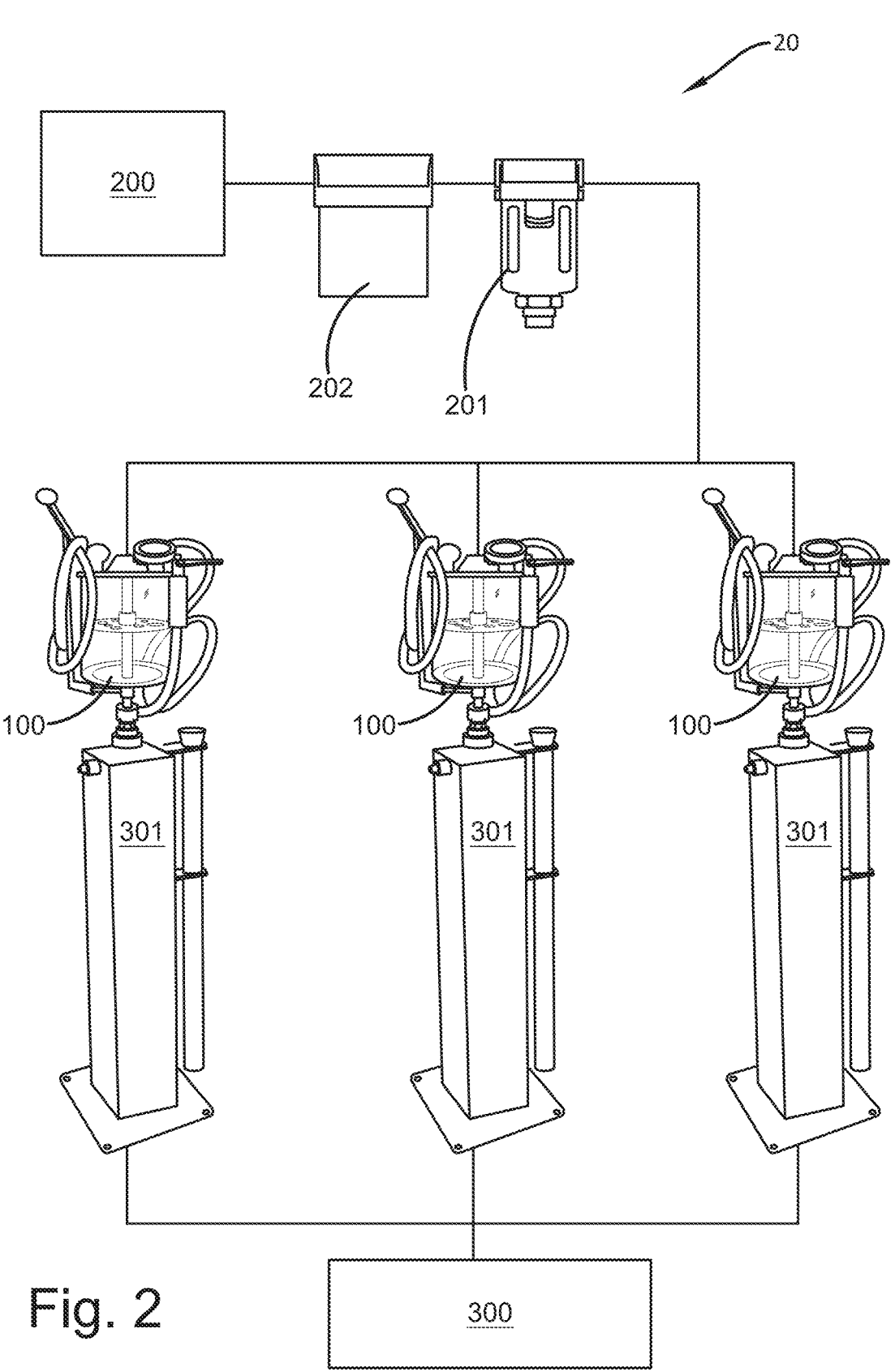
FIG. 2 is a schematic view of an embodiment of a fluid evacuation system according to an embodiment of the present invention.
Figure 3:
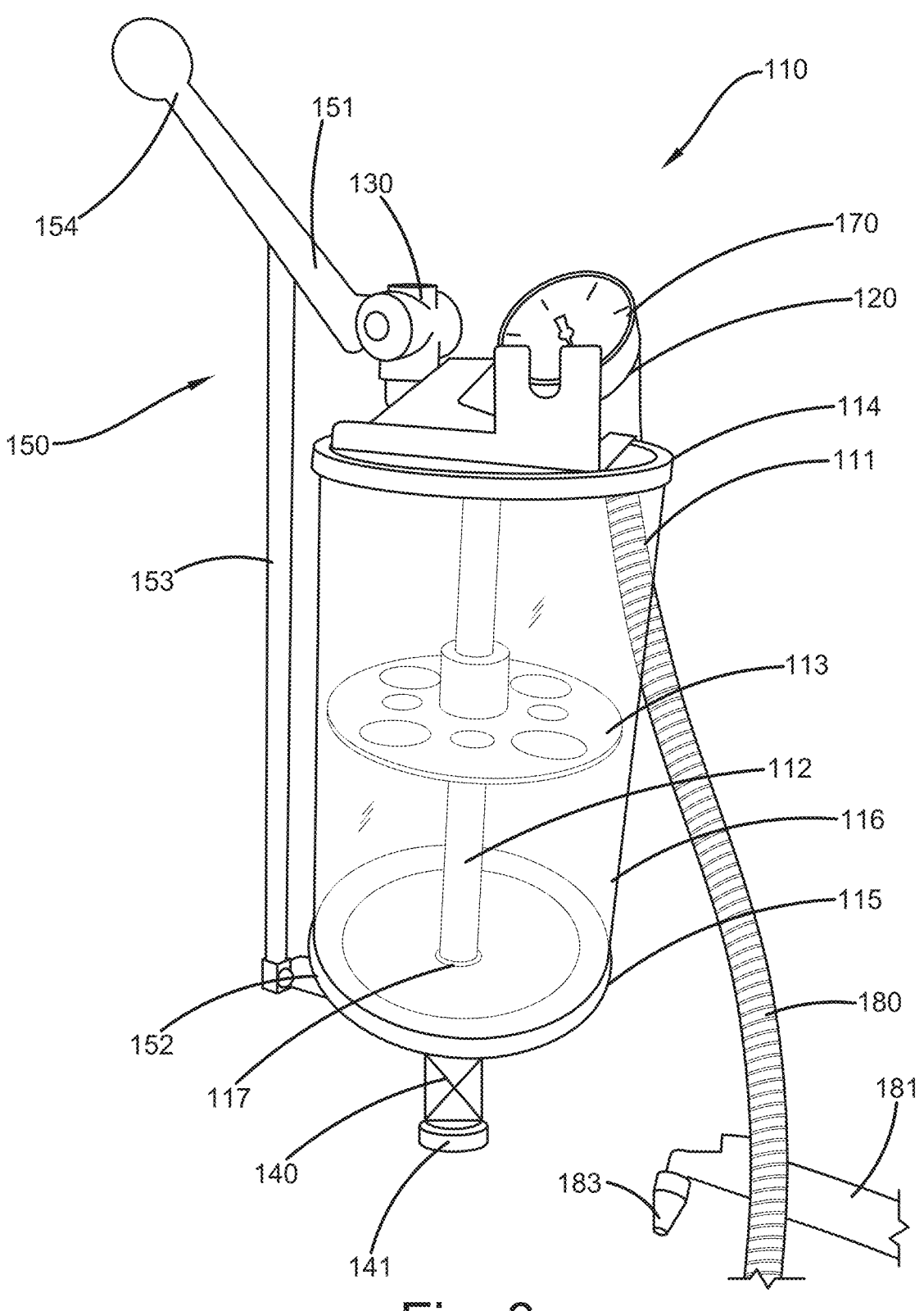
FIG. 3 is a perspective view of an embodiment of a fluid evacuation collection vessel assembly according to an embodiment of the present invention.

As shown in FIG. 2, another exemplary fluid evacuation system 20 is shown. Fluid evacuation system 20 includes vacuum source 200, which is a centralized vacuum system with a plurality of vacuum lines arranged in fluid communication with a plurality of fluid extraction apparatuses 100. In this and other embodiments the vacuum lines may be mounted to boom arms, cranes, and other devices so that the vacuum lines may be positioned at a variety of locations within a facility. In these and other embodiments, other devices may include a retractable hose connected to the vacuum system that may then be extended to connect to a fluid extraction apparatus during use, such other devices may further include a balancer system, boom arm, and hose reel. A centralized vacuum system and source provides for simplification of the fluid evacuation system and improves the quality of vacuum within the fluid evacuation system because the system is less sensitive to changes in pressure due to the increase in the overall volume of the vacuum within the fluid evacuation system. In this and other embodiments, each fluid extraction apparatus 100 of the plurality of fluid extraction apparatuses is independently operable for each performing a fluid evacuation process. Such an arrangement advantageously simplifies the design requirements of the fluid extraction apparatus by having a single vacuum source generate vacuum pressure for a plurality of fluid extraction apparatuses 100.

In one or more embodiments, fluid evacuation systems according to the present invention include one or more fluid extraction apparatuses. In other embodiments, fluid evacuation systems include two or more fluid extraction apparatuses. In other embodiments, fluid evacuation systems include three or more fluid extraction apparatuses. In other embodiments, fluid evacuation systems include four or more fluid extraction apparatuses. In other embodiments, fluid evacuation systems include five or more fluid extraction apparatuses. In these and other embodiments, the vacuum system of the fluid evacuation system is sized such that any number of fluid extraction apparatuses may be operated simultaneously to perform a fluid extraction process.

Fluid reservoir 300 is configured to provide bulk storage one or more fluids extracted using fluid evacuation system 10. Fluid reservoirs suitable for use in the present invention may be selected based upon the types of fluid to be extracted using fluid evacuation system 10. For example, fluid reservoir 300 may be a tank suitable for storing used motor oil. Further, fluid reservoirs suitable for use in the present invention may be selected based upon. For example, fluid reservoir 300 may be a subterranean storage tank, a portable oil drain, a portable oil container, or a mobile tank mounted to a cart for transporting extracted fluids for other storage and disposal.

Fluid Evacuation Collection Vessel Assembly

An illustrative embodiment of the present invention directed towards a fluid evacuation collection vessel assembly 110 is provided in FIGS. 3 through 8. As shown in FIGS. 3 through 8, a collection vessel 111 for receiving a fluid as part of a fluid evacuation system is provided. Collection vessel 111 includes an internal volume for containing an extracted fluid. Collection vessel 111 includes a support member 112. A reinforcement member 113 is mounted to support member 112, wherein reinforcement member 113 maintains the internal volume of collection vessel 111 during operation of the fluid evacuation system. Collection vessel 111 is substantially cylindrical with a top end 114, a bottom end 115, and a wall 116 extending between top end 114 and bottom end 115. In some embodiments, the support member is a centrally positioned threaded rod secured to the top end and secured to and extending through the bottom end. In some embodiments, the reinforcement member is a disk mounted to support member wherein reinforcement member extends outwardly from the support member and is proximate to an inner surface of the wall extending between the top end and the bottom end. In these and other embodiments, the disk shape of the reinforcement member provides reinforcement to the wall to thereby prevent the wall from deforming when the internal volume of collection vessel is subjected to vacuum pressure. In some embodiments, support member 112 is a centrally positioned threaded rod that further includes a drain 117 adjacent to bottom end 115 of collection vessel 111.

Fluid evacuation collection vessel assembly 110 further includes an extraction inlet 120 in fluid communication with an extraction device including hose 180 attached to a handle 181 with a valve 182 and nozzle 183. Extraction inlet 120 further includes vacuum pressure gauge 170. Fluid evacuation collection vessel assembly 110 further includes a vacuum source port 130, which may be referred to as a vacuum source valve 130 or a vacuum and vent valve 130, is configured for fluid communication with a vacuum source and collection vessel 111. In this and other embodiments vacuum source valve 130 is able to open to atmosphere such that the collection vessel 111 is in fluid communication with or vented to atmosphere. In other embodiments a separate vent valve may be used to vent collection vessel 111 to atmosphere. Fluid evacuation collection vessel assembly 110 further includes a drain valve 140 in fluid communication with collection vessel 111 and an outlet 141. Fluid evacuation collection vessel assembly 110 further includes an interconnection 150 that connects vacuum source valve 130 and drain valve 140. Vacuum source valve 130 is selectively operable between a vacuum position and an atmospheric position. When vacuum source valve 130 is in the vacuum position, the vacuum source creates a vacuum within the internal volume of fluid evacuation collection vessel assembly 110. When the vacuum source valve 130 is in the atmospheric position the internal volume of fluid evacuation collection vessel assembly 110 is vented to atmospheric pressure to facilitate draining of an evacuated fluid through drain valve 140. Drain valve 140 is selectively operable between a closed position and an open position. When drain valve 140 is in the closed position, fluid evacuated using fluid evacuation collection vessel assembly 110 is collected and retained within the internal volume of collection vessel 111. When drain valve 140 is in the open position, fluid evacuated using fluid evacuation collection vessel assembly 11 and collected within the internal volume of collection vessel 111 may flow through drain 140 and outlet 141.

Extraction Device

A variety of extraction devices may be used in embodiments of fluid extraction apparatuses according to the present invention. The extraction device may be connected to the fluid evacuation collection vessel assembly via a flexible hose suitable for use with the vacuum. The extraction device may further include its own valves for sealing the fluid evacuation collection vessel assembly from atmosphere when not in use. In some embodiments, the evacuation means includes a handle. In these and other embodiments, the evacuation means includes a probe or a wand for establishing fluid communication with a fluid reservoir. The probe or wand may be inserted into the fluid contained in the fluid reservoir. In other embodiments, a variety of sealing means including adapters, O-rings, and others known in the art may be used to create a vacuum seal at the fluid port to create the fluid communication and does not require insertion into the fluid reservoir.

Figure 9:
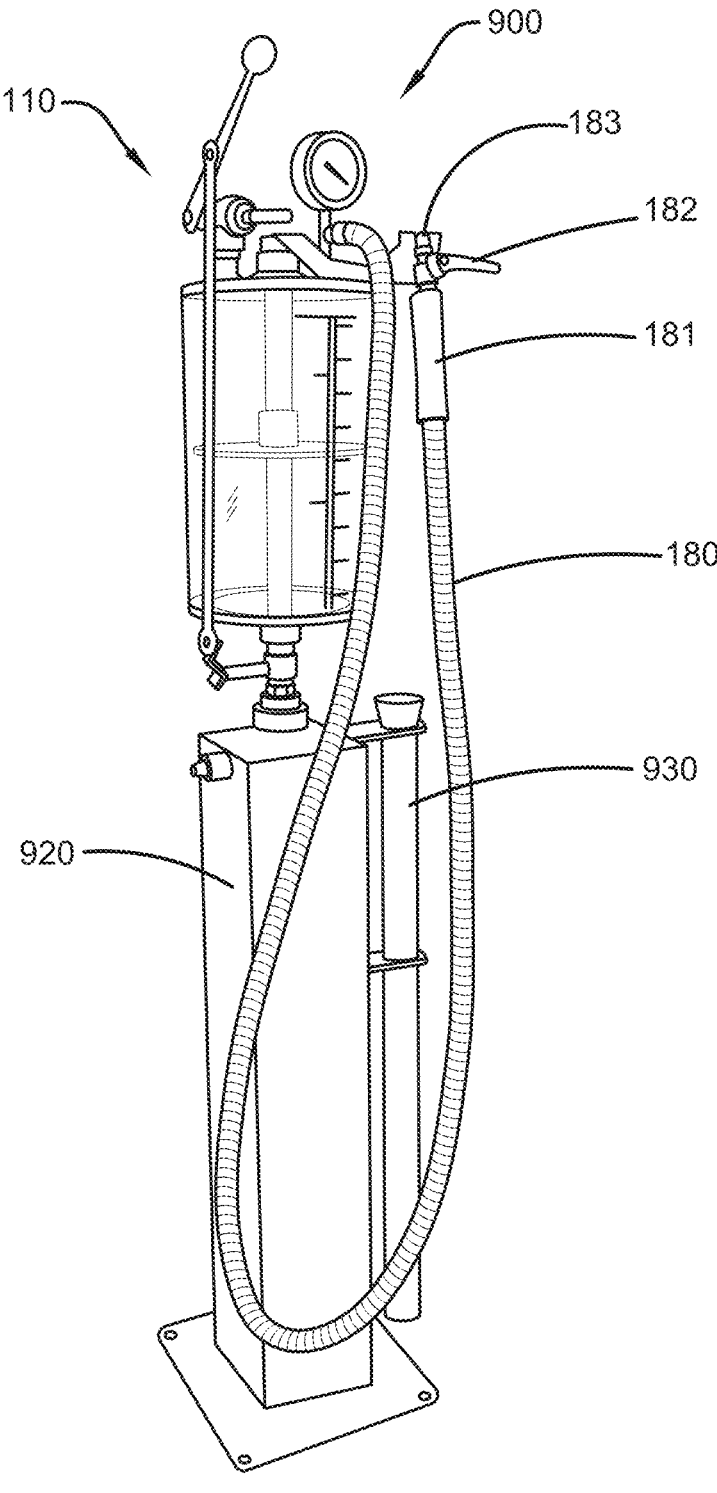
FIG. 9 is a perspective view of an embodiment of a fluid evacuation collection vessel assembly according to an embodiment of the present invention.
Figure 10:
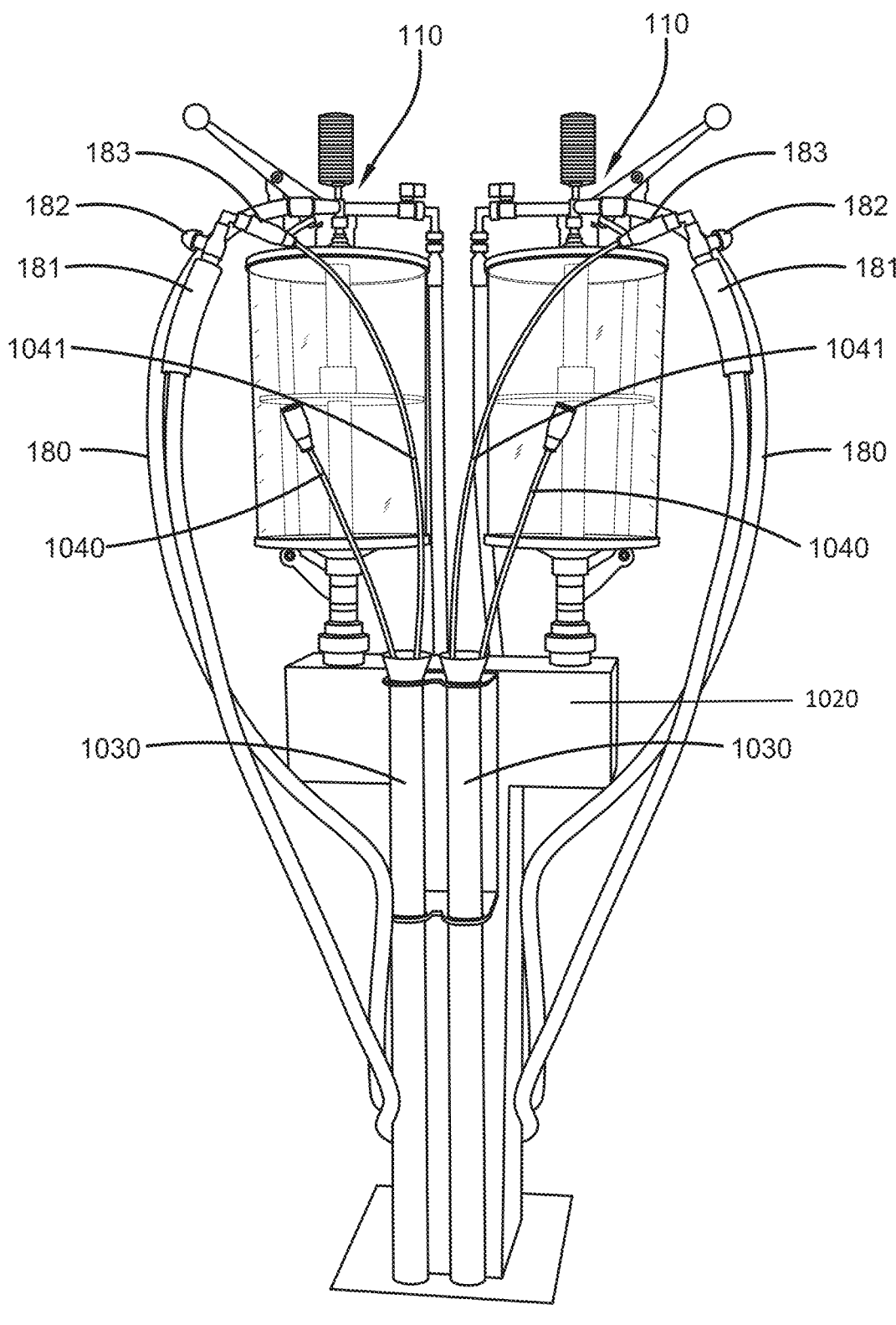
FIG. 10 is a perspective view of an embodiment of a fluid evacuation collection vessel assembly according to an embodiment of the present invention.

As shown in FIGS. 3-6, 8-10, suitable extraction device for use with bowl assemblies according to the present invention include a hose 180 attached to a handle 181 with a valve 182 and nozzle 183. Hose 183 is in fluid communication with extraction inlet 120 such that when the internal volume of collection vessel 111 is subjected to vacuum, hose 180 and handle 181 and nozzle 183 are also subjected to vacuum. Valve 182 may be open or closed in order to procced with the extraction of a fluid through nozzle 183, valve 182, handle 181, hose 180 and extraction inlet 120 into collection vessel 111. As shown in FIG. 10, wands 1040, 1041 are shown with wands 1041 attached to nozzles 183. Wands 1040,1041 may be placed in a fluid reservoir during a fluid extraction process to facilitate extraction of the fluid through wands 1040, 1041 nozzle 183, valve 182, handle 181, hose 180 and extraction inlet 120 into collection vessel 111.

Interconnection

As shown in FIGS. 3-9, interconnection 150, which may also be referred to as interconnect 150, is a mechanical interconnect comprising a vacuum source valve extension 151, a drain valve extension 152, a vertical extension 153, and a handle portion 154. Vacuum source valve extension 151 is attached to and configured to operate vacuum source valve 130. Drain valve extension 152 is attached to and configured to operate drain valve 140. Vertical extension 153 is attached to vacuum source valve extension 151 and drain valve extension 152. Handle portion 154 is configured to be raised or lowered by a user in order to operate interconnect 150 in each of a plurality of interconnected states including changing the positions of vacuum source valve 130 and drain valve 140.

According to various embodiments of the present invention, the interconnection of the vacuum source valve and the drain valve provides for controlled operation of the fluid evacuation assembly. As used herein, interconnection of these valves means that the state of one valve influences the other. Accordingly, when the position of one valve is changed, the position of the other is also changed. Embodiments of the present invention use a variety of interconnection means such that a user need only perform a single action to effect a change in the interconnected states. It is further understood that in embodiments of the present invention employing additional valves beyond a vacuum source valve and a drain valve, such as a vent valve, the interconnection may link the operation of all of the valves present. Without wishing to be bound by theory, it is understood that the fluid evacuation bowl assembly functions to extract a fluid when it is subjected to vacuum from a vacuum source via the vacuum source valve and that the integrity of that vacuum is maintained by closing the drain valve and the any valves that may be vented to atmosphere. It is further understood that evacuated fluid may be drained from the fluid evacuation bowl assembly by closing the vacuum source valve and venting the fluid evacuation bowl assembly to atmosphere while the drain valve is opened. Accordingly, it is understood that an interconnection may be formed between any number of valves present capable of influencing these states.

Figure 4:
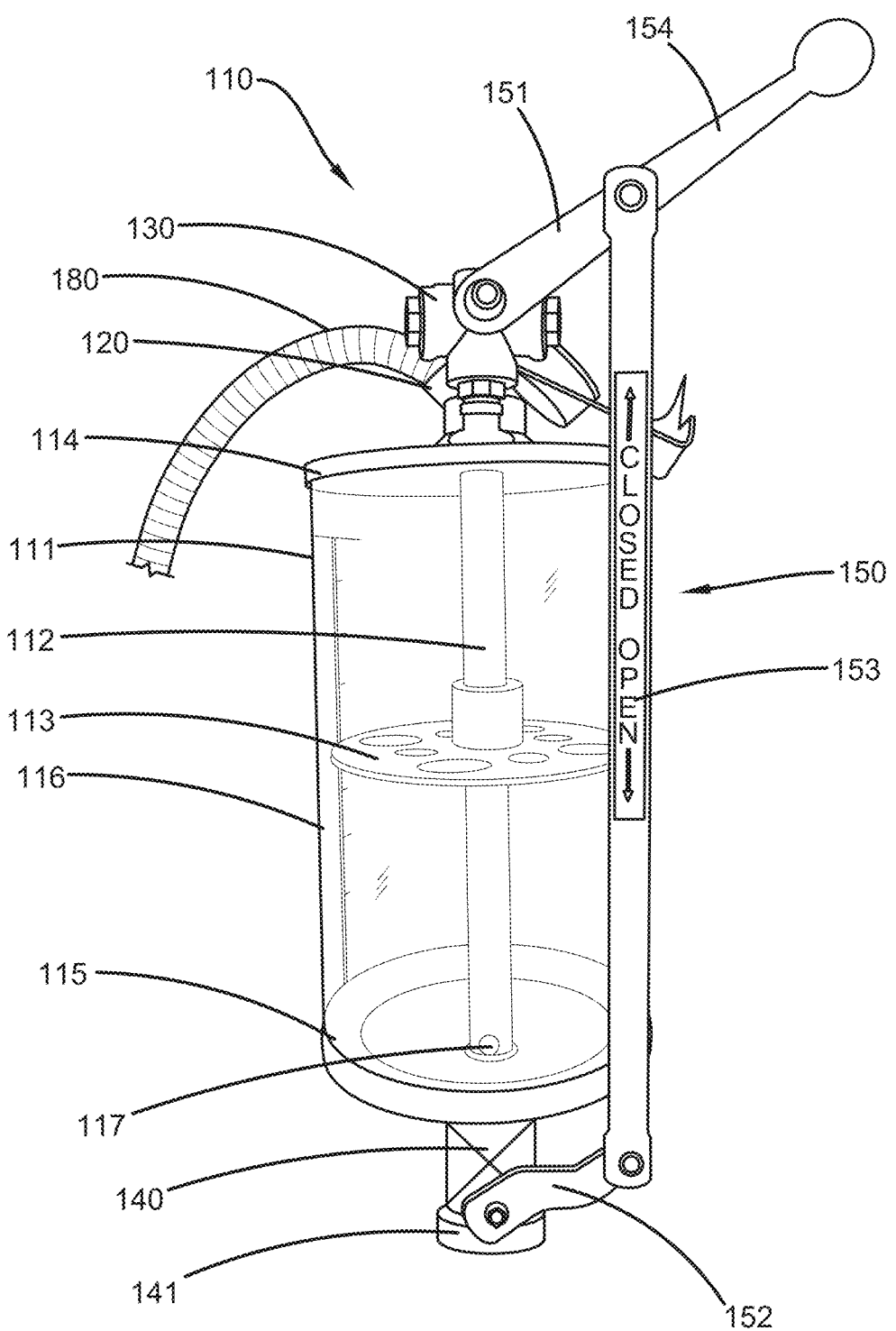
FIG. 4 is a perspective view of an embodiment of a fluid evacuation collection vessel assembly according to an embodiment of the present invention.
Figure 5:
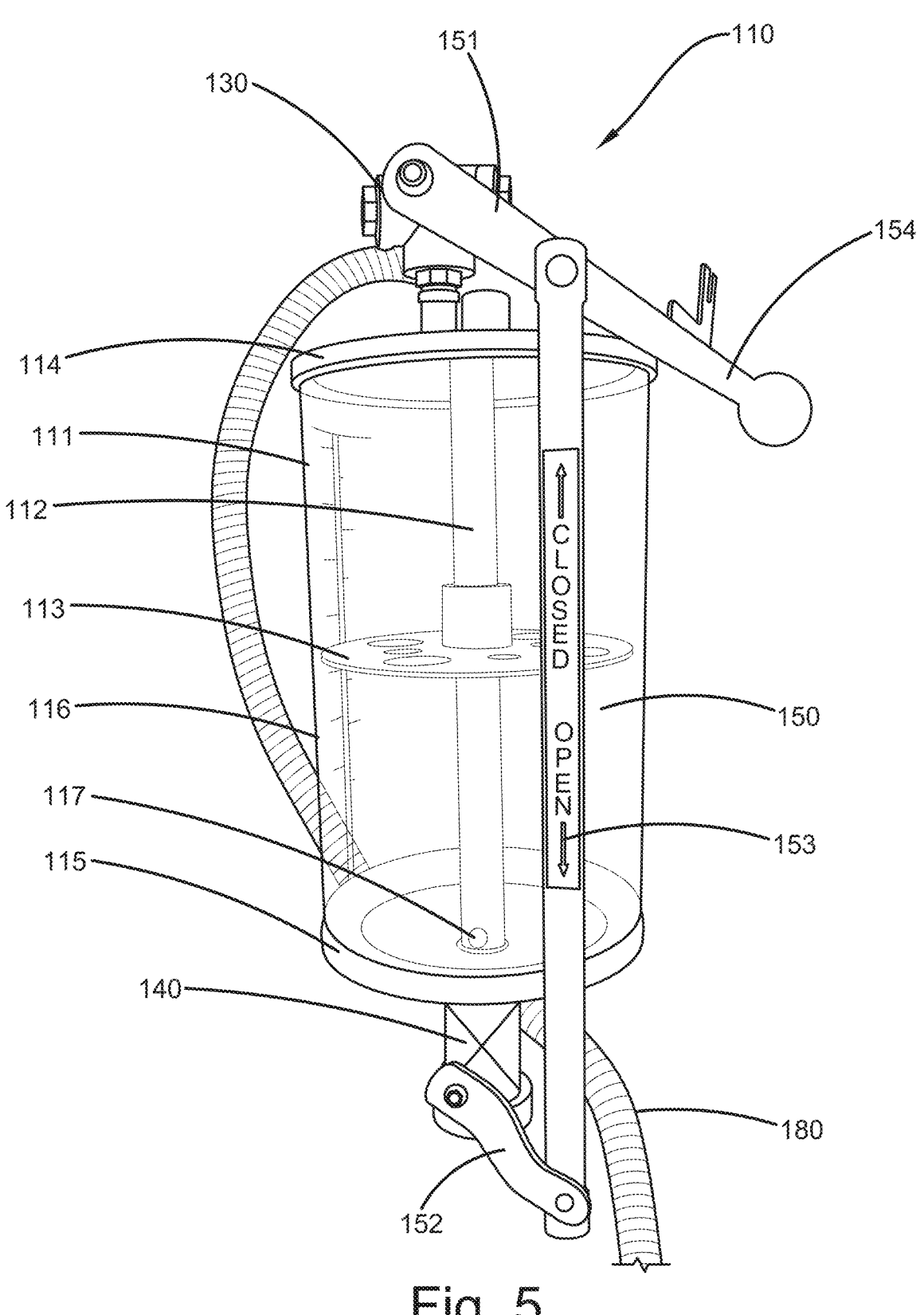
FIG. 5 is a perspective view of an embodiment of a fluid evacuation collection vessel assembly according to an embodiment of the present invention.
Figure 6:
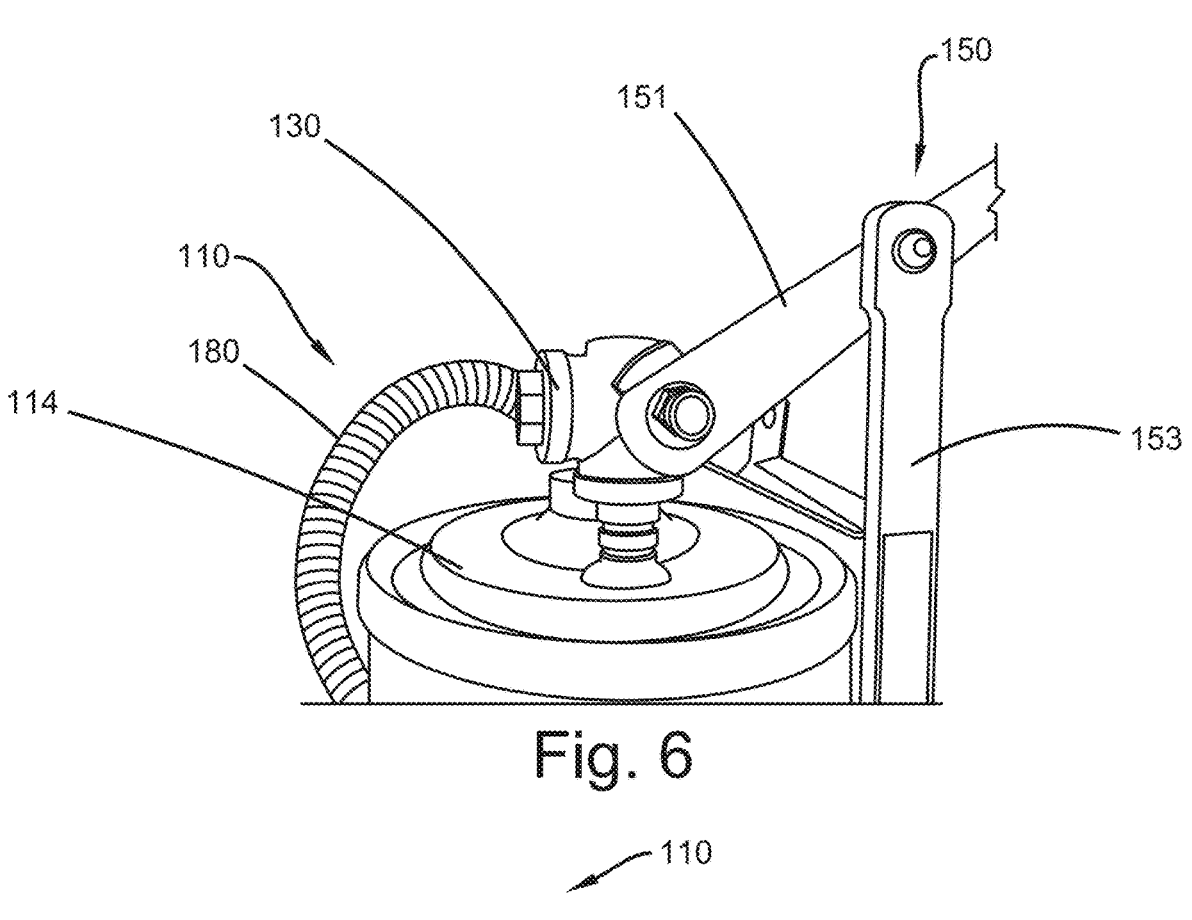
FIG. 6 is a perspective view of an embodiment of a fluid evacuation collection vessel assembly according to an embodiment of the present invention.
Figure 7:
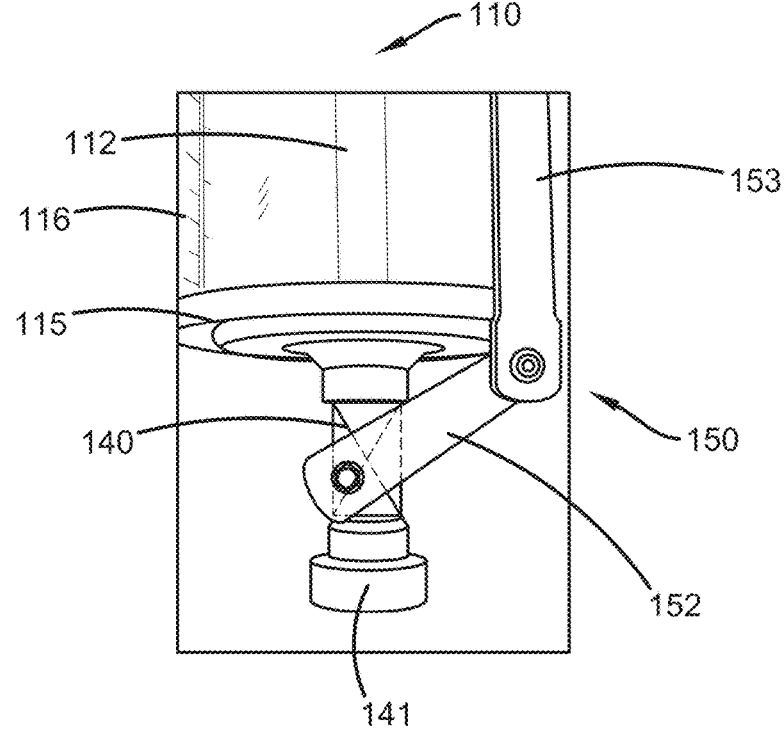
FIG. 7 is a perspective view of an embodiment of a fluid evacuation collection vessel assembly according to an embodiment of the present invention.
Figure 8:
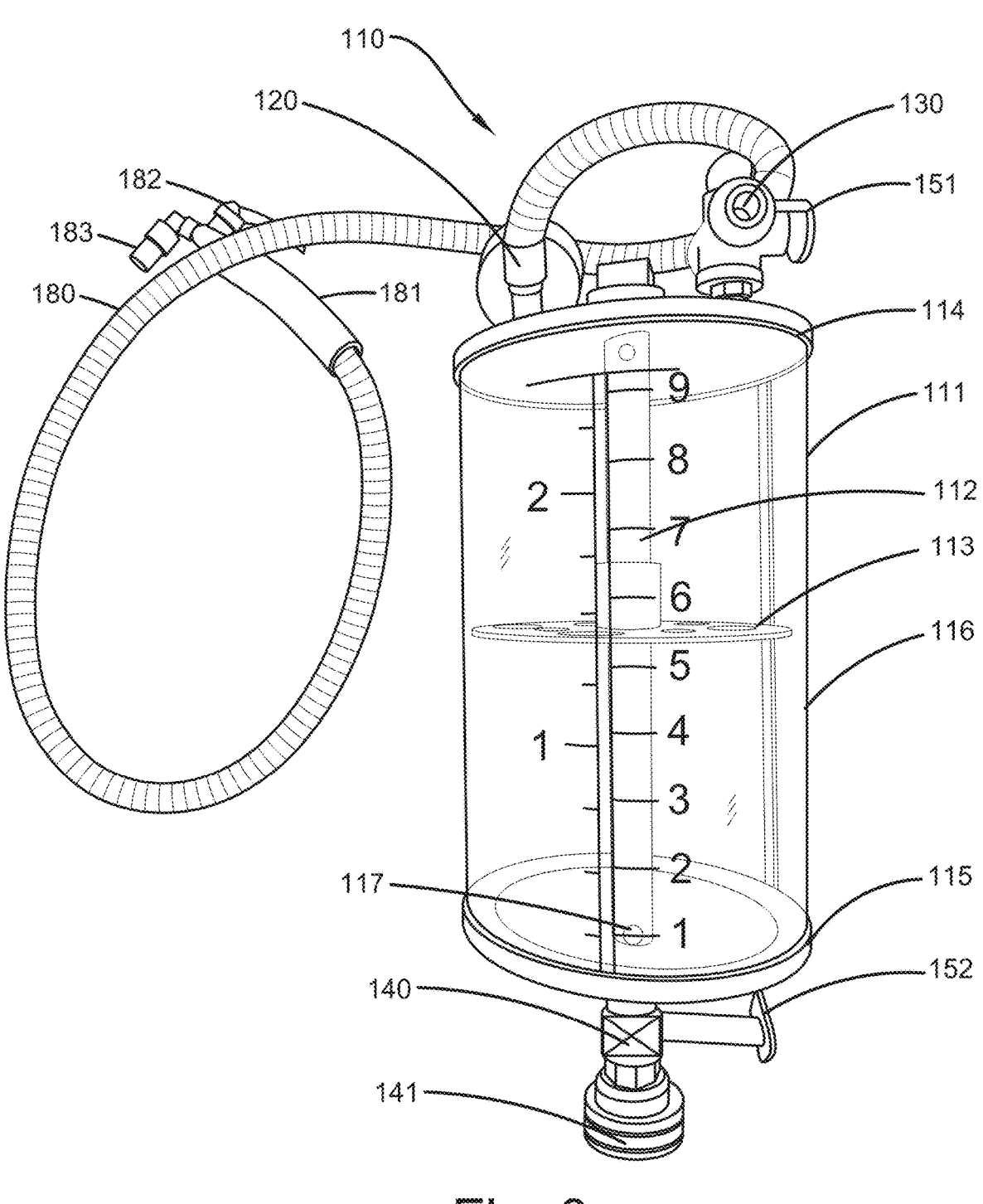
FIG. 8 is a perspective view of an embodiment of a fluid evacuation collection vessel assembly according to an embodiment of the present invention.

For example, as shown in FIGS. 4 and 5, interconnection 150 may be operated using handle 154 between a first state, which may also be referred to as a vacuum state or a fluid extraction state, and a second state, which may also be referred to as a drain state or a vent state. In the first state, the fluid extraction state, as shown in FIG. 4, interconnection 150 is raised using handle 154 such that vacuum source valve 130 is open to the vacuum source and a vacuum is created within the internal volume of collection vessel 111 through vacuum source valve 130, while drain valve 140 is closed. In the second state, the drain state, as shown in FIG. 5, interconnection 150 is lowered using handle 154 such that vacuum source valve 130 is closed to the vacuum source and vented to atmosphere such that the internal volume of collection vessel 111 is at atmospheric pressure, while drain valve 140 is open and fluid stored within the internal volume of collection vessel 111 is able to flow through drain 140 and outlet 141.

Various interconnected states suitable for use in embodiments according to the present invention include that in a first interconnected state, a fluid extraction state, the vacuum source valve is in an open to the vacuum source position and the drain valve is in a closed position. In this fluid evacuation state, the vacuum source forms a vacuum within the fluid evacuation collection vessel assembly and therefore also the extraction device, in fluid communication with the fluid evacuation collection vessel assembly via the extraction inlet. Since the vacuum exists in the evacuation device, the evacuation device may be used to evacuate a fluid from a reservoir. In a second interconnected state, a drain state, the vacuum source valve is closed to the vacuum source and the drain valve is in the open position. In some embodiments, when in the drain state, the vacuum source valve is closed to the vacuum source and opened or vented to atmosphere such that the fluid evacuation collection vessel is subjected to atmospheric pressure. In other embodiments, when in the drain state, the vacuum source valve is closed to the vacuum source and a separate vent is opened to atmosphere such that that the fluid evacuation collection vessel is subjected to atmospheric pressure. In this drain state, the fluid evacuation collection vessel assembly is no longer subject to vacuum pressures and a combination of atmospheric pressure and gravity acts on the extracted fluid in the fluid evacuation collection vessel to flow through the drain valve and outlet of the fluid evacuation collection vessel assembly. From there, the extracted fluid may flow through other intermediate drainage assemblies and ultimately to a fluid reservoir or other safe fluid storage.

Accordingly, interconnects are operated between the plurality of interconnected states depending upon the progress of a fluid evacuation process. For example, during the fluid evacuation process the extraction device is placed in fluid communication with a fluid within a fluid reservoir, the interconnect is operated in the fluid extraction state, and the vacuum source thereby forms and maintains a vacuum to thereby cause an extraction of the fluid through the extraction device and into the collection vessel. At the completion of the evacuation process the interconnect is operated in the drain state, and the extraction device is removed from fluid communication with the fluid reservoir and the extracted fluid in the collection vessel is drained from the collection vessel.

In some embodiments of the present invention, the vacuum source valve and the drain valve may have staggered timing when switching between states when the interconnect is operated. For example, when operating the interconnect to a fluid extraction state, the drain valve reaches the closed state prior to the vacuum source valve reaching the open position to thereby subject the fluid extraction apparatus to vacuum pressure. Further, when operating the interconnect from the fluid extraction state to the drain state, the vacuum source valve is closed to the vacuum source prior to the drain valve reaching the open position. Without wishing to be bound by theory it is believed that staggering the valve timing may prevent unwanted movement of the extracted fluids, including potential infiltration of an extracted fluid into the vacuum source system. Various mechanisms for modifying the valve timings may be employed, including, but not limited to, spring loaded mechanisms, electronic control delays, and other means known in the art.

While a mechanical interconnect is provided in the embodiment of the invention as shown in FIGS. 3-11, many other types of interconnections are suitable for use in embodiments of the present invention. For example, the valves, including the vacuum source valve and the drain valve of fluid evacuation collection vessel assemblies may comprise actuators, including electronic, hydraulic, and other types of actuators known in the art, that are controlled by a control system which includes an operator or user interface. Accordingly, the states of both the vacuum source valve and the drain valve, and any additional valve, may be changed utilizing the control system. In these and other embodiments, a visual display may be used to communicate the state that the system is in.

Embodiments of the present invention advantageously provide for simplified operation of the fluid extraction system. Specifically, a user seeking to perform a fluid extraction operation need only to perform a single operation of the interconnect, such as moving a lever between a first position and a second position, or pressing a single button to affect the operation of the fluid extraction system.

In some embodiments the vacuum source port is located at the top end of the fluid evacuation collection vessel assembly. In other embodiments, the vacuum source port is located at the wall of the fluid evacuation collection vessel assembly. Generally, the vacuum source port is located such that it is able to be interconnected with the drain valve and to minimize the probability of extracted fluids infiltrating the vacuum system. While the vacuum system has safeguards and protective features in place, ensuring that the extracted fluid is significantly contained within the fluid evacuation collection vessel assembly is readily achieved in embodiments according to the present invention. Further, by locating the vacuum source port above the designed maximum extracted fluid threshold, the vacuum source port is able to be opened to atmosphere so that atmospheric pressure may be used to empty the fluid evacuation collection vessel assembly during a draining process.

In some embodiments the drain valve is located at the bottom end of the fluid evacuation collection vessel assembly. In other embodiments, the drain is located in the support member proximate to the bottom end of the fluid evacuation collection vessel assembly. In yet other embodiments, the drain valve is formed in the wall of the fluid evacuation collection vessel assembly proximate to the bottom end of the fluid evacuation collection vessel assembly. Generally, the drain valve is positioned such that it is able to be interconnected with the drain valve and to maximize the ability of the fluid evacuation collection vessel assembly to empty when subjected to atmospheric pressure and the effects of gravity. Locating the drain valve proximate to the bottom end of the fluid evacuation collection vessel assembly ensures that a minimal amount of collected extracted fluid remains in the fluid evacuation collection vessel assembly at the completion of a draining process.

In some embodiments the extraction inlet is located at the top end of the fluid evacuation collection vessel assembly. In other embodiments, the extraction inlet is formed in the wall of the fluid evacuation collection vessel assembly proximate to the top end of the fluid evacuation collection vessel assembly. Generally, the extraction inlet is positioned such that it is able to be exposed to consistent vacuum pressure to provide the driving force required to extract a fluid from an external reservoir. Locating the extraction inlet proximate to the top end of the fluid evacuation collection vessel assembly ensures that the extracted fluid fills the fluid evacuation collection vessel assembly from bottom to top, while maintaining the quality of the vacuum pressure at the extraction device via the extraction inlet. Optionally, the vacuum pressure gauge may be collocated with the extraction inlet. In this configuration, a user is readily able to identify whether a suitable amount of vacuum pressure is available at the extraction device for performing a fluid evacuation process.

A variety of collection vessel geometries are acceptable for use with fluid evacuation collection vessel assemblies according to the present invention. Generally, the size and shape of the collection vessel assembly is selected according to the specific fluid evacuation application. Specifically, the collection vessel should be sized according to the expected volume of fluid to be evacuated including extra safety tolerances to prevent spills or infiltration into the vacuum system. Collection vessels may be generally cylindrical to minimize the footprint taken up at a service center while providing a large enough volume for the fluid to be collected.

Many materials are suitable for use to construct the fluid evacuation collection vessel assemblies contemplated by the present invention. Generally, the materials are selected to be compatible with the fluids being evacuated or extracted. Important factors include rigidity to withstand the vacuum generated by the vacuum source. Additionally, the fluids being extracted may be at the operating temperature of a combustion engine and are therefore considered hot. Accordingly, the material selected should be compatible with fluids at the operating temperature of an engine.

In some embodiments, the wall comprises a non-opaque material. In these and other embodiments, the selection of a non-opaque material allows for visual inspection of the evacuated fluid by the operator. Visual inspection allows for the diagnosis of potential problems that may be indicated by a discoloration or other visual indicator that further maintenance may be required. Additionally, the collection vessel may include a plurality of markings to indicate a fluid volume of an extracted fluid within the collection vessel to ensure that the appropriate amount of fluid was in the fluid reservoir and that the fluid system does not have any leaks.

With respect to the reinforcement member, in some embodiments, the reinforcement member is provided to provide reinforcement to the structure of the collection vessel when vacuum is generated within. The shape and size of the reinforcement member may vary depending upon the geometry and construction of the collection vessel. The reinforcement member increases the reliability of the collection vessel after sustained and repeated use of the fluid evacuation collection vessel assembly. In some embodiments, the reinforcement member may include a plurality of apertures to ensure that fluid can readily flow within the collection vessel.

Mounting Fluid Evacuation Collection Vessel Assemblies

Fluid evacuation collection vessel assemblies according to the present invention may be mounted to a variety of suitable mounts. In some embodiments, the fluid evacuation collection vessel assembly is mounted to a pedestal. In yet other embodiments, the fluid evacuation collection vessel assembly is wall mounted.

As shown in FIGS. 9 and 10, fluid evacuation collection vessel assemblies 110 are mounted to pedestal mounts 920, 1020. Such pedestals may be secured to a floor and connected with a drainage system including a fluid reservoir for collecting and storing the extracted fluids. The embodiment shown in FIG. 9 includes a single pedestal mount 920 for fluid evacuation bowl assembly 110 and additional accessories 930 for storing extraction wands. The embodiment shown in FIG. 10 includes a dual pedestal mount 1020 for fluid evacuation collection vessel assemblies 110 such that the two fluid evacuation collection vessel assemblies are connected to the same drain in fluid communication with the fluid reservoir. Dual pedestal mount 1020 further includes additional accessories 1030 for storing extraction wands 1040, 1041. This and similar embodiments are desirable in environments where multiple bays of a maintenance shop are present in order to reduce the number of drainage systems needed while allowing for at least two bays to simultaneously perform fluid extraction systems, independently from one another. In both the single-mount and dual-mount configurations the pedestal includes structural support for securely supporting the fluid evacuation collection vessel assemblies while also including a drain pipe within the pedestal in the fluid communication with the drains of the fluid evacuation collection vessel assemblies. In some embodiments the drain pipe has a larger diameter than the drain of the fluid evacuation collection vessel assemblies so as to minimize friction forces acting on the fluid and increase the rate at which the collected fluid drains. The bottom of the pedestal may include fasteners for securing the pedestal to the floor. The bottom of the pedestal may further include connection means for forming a leak-free connection to the fluid reservoir.

In some embodiments, the pedestal or other mounting means may serve as an intermediate funnel-like apparatus for flowing an extracted fluid to the fluid reservoir. For example, the pedestal may have a pipe or tube with a larger diameter than the diameter of the drain attached to the fluid evacuation collection vessel assembly. The inclusion of such piping and tubing allows for extracted fluids to flow freely through the pedestal for storage without delaying the emptying of the fluid evacuation collection vessel assembly.

Figure 11:
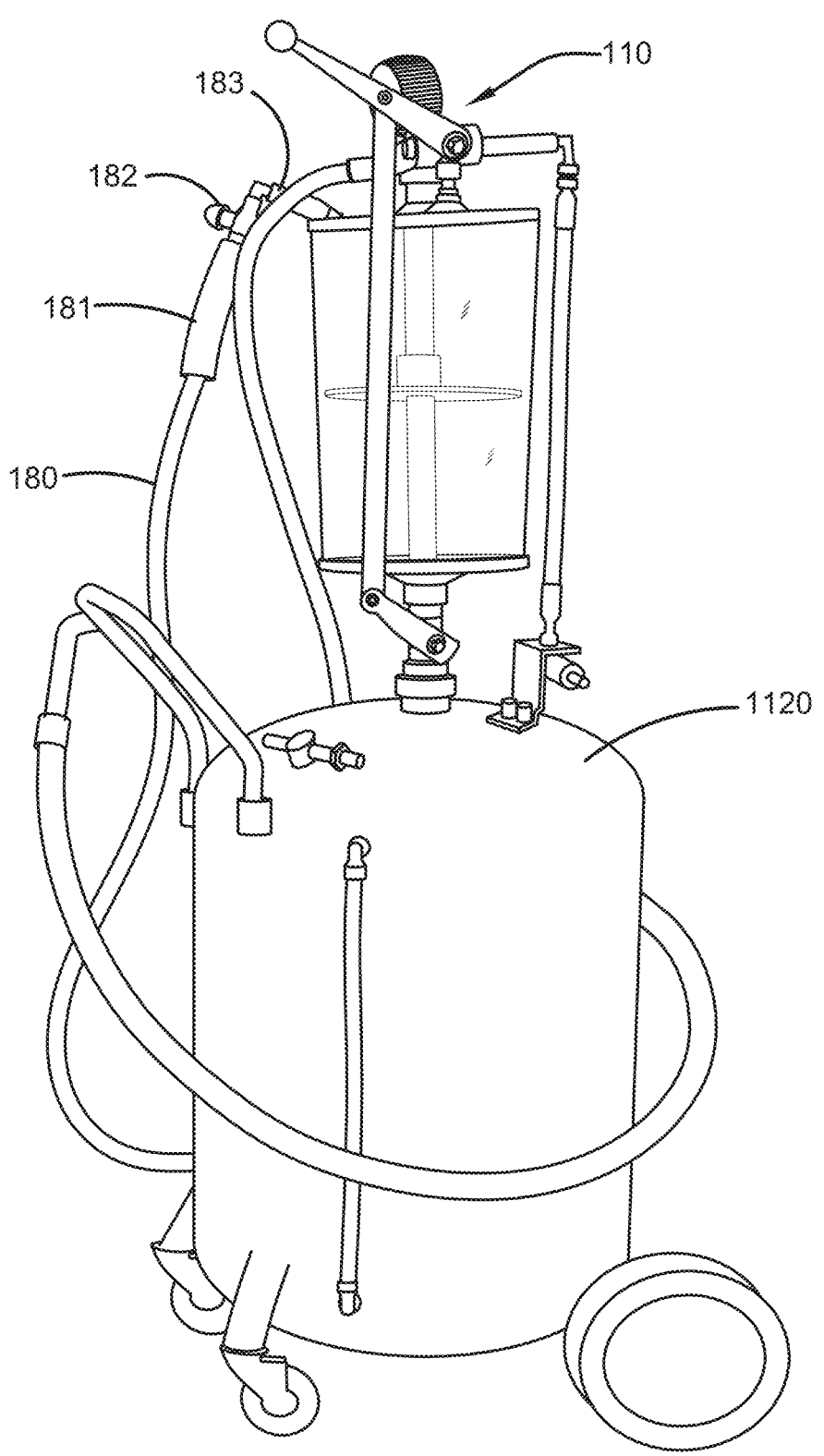
FIG. 11 is a perspective view of an embodiment of a fluid evacuation collection vessel assembly according to an embodiment of the present invention.

As shown in FIG. 11, fluid evacuation collection vessel assemblies according to the present invention may be mounted to portable reservoirs. Specifically, portable reservoir mount 1120 is in fluid communication with fluid evacuation bowl assembly 110 which is mounted to the top of portable reservoir mount 1120. Portable reservoirs allow for fluid evacuation to be performed in environments where no additional drainage infrastructure is present, as fluid evacuation bowl assembly 110 merely requires a vacuum source to be used in an extraction process.

Fluid evacuation collection vessel assemblies according to the present invention may be further connected to a drain apparatus to collect fluid evacuated and drained from the fluid evacuation collection vessel assembly. In some embodiments, the drain apparatus acts as a funnel to allow the fluid to be collected in a larger storage tank. In some embodiments, a large diameter pipe is used for the drain apparatus such that losses in flow due to drag do not interfere with operation of the fluid evacuation collection vessel assembly as viscous fluids may be evacuated.

Fluid Extraction Processes

A variety of processes may be performed using embodiments of fluid evacuation systems according to the present invention. For example, a user may extract a fluid using an embodiment of the fluid evacuation system according to the following procedure. A user of an embodiment of a fluid evacuation system according to the present invention, activates a vacuum source in fluid communication, via a vacuum line, with a fluid evacuation collection vessel assembly to thereby evacuate air and cause a vacuum within the fluid evacuation collection vessel assembly. The air is evacuated, and the vacuum pressure is maintained within the fluid evacuation collection vessel assembly via the vacuum source valve of the fluid evacuation collection vessel assembly being in an open to vacuum position and interconnected with the drain valve of the fluid evacuation collection vessel assembly, where the drain valve is in a closed position. An extraction device in fluid communication with the fluid evacuation collection vessel assembly via an extraction inlet of the fluid evacuation collection vessel assembly includes a wand suitable for extracting fluid from an external fluid reservoir, such as a car oil reservoir. The user then manipulates the extraction device to place the tip of the wand in the external fluid reservoir and opening any valve present on the extraction to device to thereby cause the vacuum pressure in the fluid evacuation collection vessel assembly to extend to the wand and thereby cause an extraction of the fluid in the external fluid reservoir. During the extraction of the fluid in the external fluid reservoir, the extracted fluid flows through the extraction device, including the wand, handle, and hose to the extraction inlet. After the extracted fluid flows through the extraction inlet, the extracted fluid falls to the bottom of the fluid evacuation collection vessel and is collected there as the gravitational forces acting on the extracted fluid prevent the vacuum pressure from causing the extracted fluid to flow through the vacuum source valve. Once the external fluid reservoir is drained of a desired amount of fluid, a user may manipulate the valve on the extraction device to the closed position and remove the extraction device from being in fluid communication with the external fluid reservoir. A user may then inspect the fluid collected in the fluid evacuation collection vessel. The total volume of fluid may be identified by observing markings and the fluid level of the fluid collected in the fluid evacuation collection vessel assembly. The user can then operate the interconnect of the fluid evacuation collection vessel assembly such that the vacuum source valve is closed to vacuum, and the drain valve is opened, and the fluid evacuation collection vessel is vented to atmosphere. In this state the atmospheric pressure and the force of gravity acting on the collected fluid causes it to drain through the drain valve and outlet of the fluid evacuation collection vessel where it may flow through further conduits or directly to a fluid reservoir for further storage and/or disposal.

In other examples, fluid evacuation systems according to the present invention include a plurality of fluid evacuation collection vessel assemblies, connected to a single vacuum source. In such embodiments, each fluid evacuation collection vessel assembly of the plurality of fluid evacuation collection vessel assemblies may be independently operated to perform extraction processes described above. The vacuum source maintains the vacuum pressure available to each fluid evacuation collection vessel assembly of the plurality of fluid evacuation collection vessel assemblies and the operation of the interconnect on each fluid evacuation collection vessel assembly ensures that the use of one fluid evacuation collection vessel assembly has minimal to no impact on the other fluid evacuation collection vessel assemblies in the system. This is particularly desirable for fluid evacuation systems installed in multiple bay service centers or fleet maintenance facilities.

In some embodiments, the fluid evacuation system includes a plurality of fluid evacuation collection vessel assemblies capable of independently performing extraction processes. In these and other embodiments, the fluid evacuation system provides an extraction rate, i.e. the amount of fluid that can be collected in the fluid evacuation collection vessel assembly per a given time, that is uniform across each of the fluid evacuation collection vessel assemblies of the plurality of fluid evacuation collection vessel assemblies. In such embodiments, the extraction rate is from 1.0 quarts of fluid per minute or greater. In such embodiments, the extraction rate is from 1.5 quarts of fluid per minute or greater. In other embodiments, the extraction rate is from 2.0 quarts of fluid per minute or greater. In other embodiments, the extraction rate is from 2.5 quarts of fluid per minute or greater. In other embodiments, the extraction rate is from 3.0 quarts of fluid per minute or greater. In other embodiments, the extraction rate is from 3.5 quarts of fluid per minute or greater. In other embodiments, the extraction rate is from 4.0 quarts of fluid per minute or greater. In other embodiments, the extraction rate is from 4.5 quarts of fluid per minute or greater. In other embodiments, the extraction rate is from 5.0 quarts of fluid per minute or greater. Those of ordinary skill in the art appreciate that the extraction rate is affected by parameters such as the inner diameter of the probe, the temperature of the fluid, and the viscosity of the fluid.

In light of the foregoing, it should be appreciated that the present invention significantly advances the art by providing a fluid evacuation collection vessel assembly and fluid evacuation system that is structurally and functionally improved in a number of ways. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

What is claimed is:

1. A collection vessel for receiving a fluid as part of a fluid evacuation system, the collection vessel comprising:
   a top end of the collection vessel;
   a bottom end of the collection vessel;
   one or more sidewalls extending between the top end and the bottom end to thereby define an internal volume for containing the fluid;
   a support member disposed within the internal volume of the collection vessel; and
   one or more reinforcement members mounted to the support member, wherein the one or more reinforcement members prevent deformation of the one or more sidewalls to thereby maintain the internal volume of the collection vessel when the internal volume is subjected to vacuum pressure, and wherein one reinforcement member of the one or more reinforcement members is disposed at a middle point between the top end and the bottom end.

2. The collection vessel according to claim 1, wherein the reinforcement member extends outwardly from the support member and is proximate to an inner surface of the one or more sidewalls to thereby prevent deformation of the one or more sidewalls when the internal volume is subjected to the vacuum pressure.

3. The collection vessel according to claim 2, wherein the support member is connected to and extends between the top end and the bottom end of the collection vessel.

4. The collection vessel according to claim 1, wherein the collection vessel is substantially cylindrical wherein the top end and the bottom end are circular, and the one or more sidewalls is a continuous sidewall extending between the top end and the bottom end.

5. The collection vessel according to claim 4, wherein the support member is secured at a center of the top end and the bottom end.

6. The collection vessel according to claim 5, wherein at least one reinforcement member of the one or more reinforcement members is a disk mounted to the support member.

7. The collection vessel according to claim 6, wherein the at least one reinforcement member is the only reinforcement member and is disposed at a middle point between the top end and the bottom end.

8. The collection vessel according to claim 1, wherein each of the one or more reinforcement members includes one or more apertures formed in the reinforcement member such that fluid may flow through the reinforcement member.

9. The collection vessel according to claim 1, wherein at least one of the one or more sidewalls comprises a plurality of markings to indicate a fluid volume of an extracted fluid within the internal volume.

10. The collection vessel according to claim 1, wherein the one or more sidewalls comprise a heat-resistant material.

11. The collection vessel according to claim 1, wherein the one or more sidewalls comprise a non-opaque material.

12. A collection vessel for receiving a fluid as part of a fluid evacuation system, the collection vessel comprising:
   a top end of the collection vessel;
   a bottom end of the collection vessel;
   one or more sidewalls extending between the top end and the bottom end to thereby define an internal volume for containing the fluid;

a support member disposed within the internal volume of the collection vessel, wherein the support member is connected to and extends between the top end and the bottom end of the collection vessel, and extends through the bottom end, wherein a drain is formed within the support member and the drain is in fluid communication with the internal volume and a drain valve; and one or more reinforcement members mounted to the support member, wherein the one or more reinforcement members extends outwardly from the support member and is proximate to an inner surface of the one or more sidewalls to prevent deformation of the one or more sidewalls to thereby maintain the internal volume of the collection vessel when the internal volume is subjected to vacuum pressure.

13. A system for evacuating fluid from a reservoir, the system comprising:

a vacuum source; and one or more fluid extraction apparatuses, each comprising:

an extraction device; and a collection vessel comprising:

an internal volume for containing the fluid, a support member disposed within the internal volume of the collection vessel, one or more reinforcement members mounted to the support member, wherein the one or more reinforcement members maintain the internal volume of the collection vessel, an extraction valve in fluid communication with the internal volume and with the extraction device, a vacuum source valve wherein the vacuum source valve is in fluid communication with the internal volume and the vacuum source, and a drain valve in fluid communication with the internal volume and a storage tank;

a pedestal including a drain pipe in fluid communication with the drain valve and the storage tank, and wherein the one or more fluid extraction apparatus is mounted to the pedestal via the drain valve; and wherein during a fluid evacuation process the internal volume is subjected to vacuum pressure generated by the vacuum source.

14. The system for evacuating fluid from a reservoir according to claim 13, wherein during the fluid evacuation process the extraction device is placed in fluid communication with the fluid within the fluid reservoir, the vacuum source creates and maintains the vacuum pressure in the internal volume to thereby extract the fluid through the extraction device and into the collection vessel.

15. The system according to claim 14, wherein during the fluid evacuation process the internal volume of the collection vessel is maintained.

16. The system according to claim 15, wherein the internal volume of the collection vessel is maintained over repeated fluid evacuation processes.

17. The system according to claim 13, wherein the drain pipe of the pedestal has an inner diameter greater than the diameter of an inner diameter of the output end of the drain valve.

18. The system according to claim 13, wherein the collection vessel further comprises:

a top end of the collection vessel;

a bottom end of the collection vessel;

one or more sidewalls extending between the top end and the bottom end;

wherein the one or more reinforcement members prevent deformation of the one or more sidewalls to thereby maintain the internal volume of the collection vessel when the internal volume is subjected to vacuum pressure.

19. The system according to claim 18, wherein one reinforcement member of the one or more reinforcement members is disposed at a middle point between the top end and the bottom end.

20. The system according to claim 18, wherein the support member extends through the bottom end, wherein a drain is formed within the support member and the drain is in fluid communication with the internal volume and the drain valve.

\* \* \* \* \*